3,671,384
Patented June 20, 1972

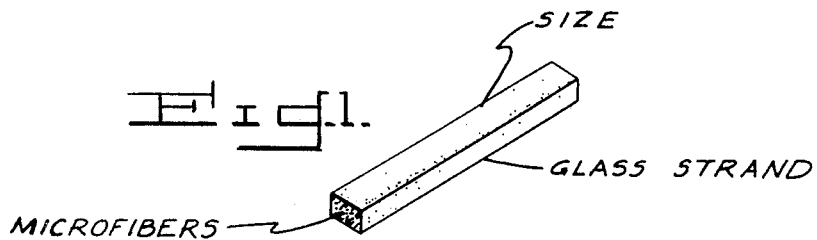
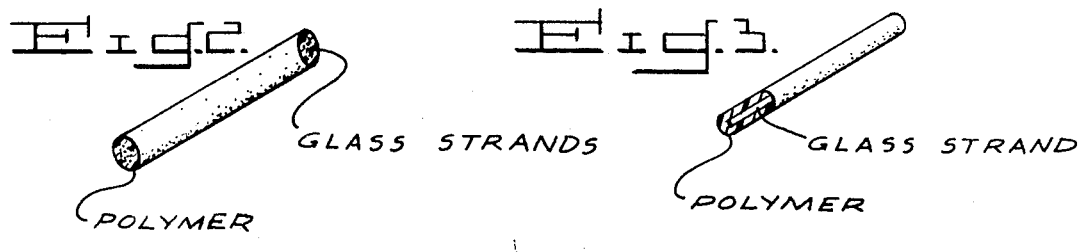
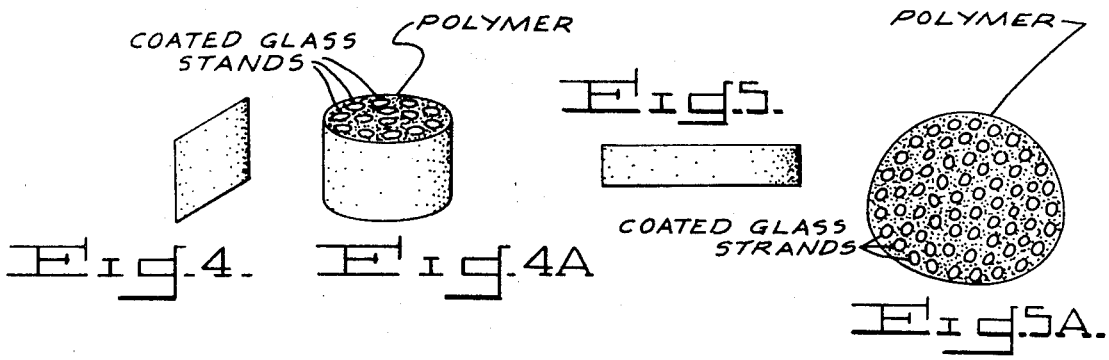
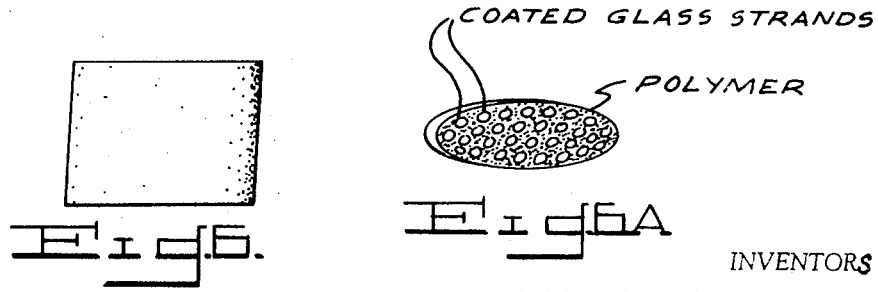

3,671,384
GLASS CONCENTRATE CAPSULES
Massimo Baer, Longmeadow, and Joseph O. Campbell, Agawam, Mass., assignors to Monsanto Company, St. Louis, Mo.
Filed Nov. 4, 1969, Ser. No. 873,799
Int. Cl. D02g 3/36
U.S. Cl. 161—170                     21 Claims

ABSTRACT OF THE DISCLOSURE

Disclosed herein are glass concentrate capsules useful in forming reinforced thermoplastic resin composites, said capsules comprising 10 to 80% by weight of glass strands having a length of from $\frac{1}{32}$ to $\frac{3}{4}$ inch which strands are arranged in a substantially collimated array within a thermoplastic resin matrix, wherein the individual strands in the collimated array and the collimated array of glass strands are encapsulated in the thermoplastic resin matrix.

BACKGROUND OF THE INVENTION

(1) Field of the invention

The present invention is directed to glass concentrate capsules which comprise a plurality of strands of glass fibers encapsulated in a collimated array within a thermoplastic resin matrix.

(2) Description of the prior art

The use of glass fibers as a reinforcing medium in thermoplastic resin composites is well known in the prior art.

In the preparation of glass fiber reinforced composites it is conventional to use strands of glass fibers which vary in length from $\frac{1}{32}$ inch to $\frac{3}{4}$ inch or longer. These glass strands are conventionally made up of from 200 to 300 microfibers having a diameter in the order of .00035 inch which are arranged in a parallel configuration. The surface of the glass strand is conventionally coated with a coupling agent and a film forming size which keeps the microfibers together and maintains the integrity of the strand. The glass strands are then dry blended with a thermoplastic resin matrix and fed to an extruder or injection molding machine wherein the fibers are distributed throughout the resin matrix and serve as reinforcing elements in the finished composite.

Dry-blending of the glass and resin matrix is considered to be the simplest, most versatile and economical route for large volume preparation of composites. However, it involves high capital investment for the equipment necessary to avoid the very severe problems of non-uniformity of glass distribution and segregation, debundling, bridging, haystacking and matting of glass during blending, feeding and processing. Consequently, special vibrator proportioning and metering feeds are required.

Debundling is the term used to describe that occurrence where the glass strand loses its integrity and the individual microfibers are scattered. Consequently, the loose microfibers would undergo bridging or form haystacking configurations (haystacking) in the hopper which feeds the extruder or injection molding machine. As a result of this haystacking, the desired feed ratio of glass fibers to resin matrix to the molding or extrusion operation would be upset and an inferior product would be produced. Alternately, the haystack would be fed to the machine in the nature of an embolism and would result in matting of the glass fibers and possible clogging of the machinery causing machine breakdown and/or inferior products.

Attempts to solve the problems of debundling and haystacking led researchers to coat the glass strand with thermoplastic resin polymers. Bradt, in U.S. Pat. 2,877,501, teaches coating the outside of an endless glass strand with a polymeric coating followed by heat treatment to fuse the polymer then cutting the strand to the desired lengths. In this method, the cut ends of the glass strands contain exposed ends of microfibers and are possible sites for subsequent debundling. Moreover, there is a polymer gradient which decreases toward the center of the strand. Consequently, the individual microfibers in the core of the strand may not be coated with polymer. Thus, the shearing forces of injection molding or extrusion could cause abrasion of the individual microfibers in the core of the strand with resulting damage to these fibers which detracts from their reinforcing ability.

Malinowski et al. in U.S. 2,688,774, Herman et al. in 3,265,644; and Wiczer in 3,278,329 provide a partial solution to the problems mentioned above by coating the glass strand with monomer followed by in situ polymerization to give a single glass strand contained within a thermoplastic resin capsule. In some instances the monomers wet the individual microfibers and upon polymerization provide a coating which helped to protect the microfibers from the adverse effects of abrasion during composite preparation.

However, in the foregoing methods, it is not possible to obtain a high concentration of glass fibers in capsule form which is a desired feature in the preparation of glass filled composites. Moreover, in many instances the capsules of the prior art, which contain a single glass strand, rather than a plurality of collimated glass strands, have a different density, size and shape than the particles of resin matrix being fed to the extruder or molding apparatus. These differences may result in segregation of the respective particles and a non-uniform product.

A need exists for glass concentrate capsules which would provide a high concentration of glass fibers in very compact form which capsules approximate the size and shape of the resin matrix with which they are blended prior to any extruding or molding operations. Moreover, a need exists for glass concentrates in capsule form which would not be susceptible to the problems of debundling, haystacking and matting of glass fibers, etc. which commonly occur when using the glass strands of the piror art. Furthermore, a definite need exists for glass concentrate capsules which would minimize the problem of glas fiber abrasion during processing.

SUMMARY OF THE INVENTION

The present invention solves the problems and fulfills the needs mentioned above by providing glass concentrate capsules which contain a high concentration of glass strands arranged in a collimated array with a thermoplastic resin matrix. In the capsules of this invention, the individual microfibers in the strands are also coated with a thermoplastic resin. These capsules can be prepared in a variety of sizes and shapes, by controlling reaction conditions in order to decrease the problem of segregation. The glass concentrate capsules of the present invention allow a significant reduction in the need for the elaborate precautions heretofore used in the prior art in order to insure a uniform and constant feed rate of glass and resin to the processing machinery. Furthermore, the problems of debundling, haystacking and matting and abrasion of glass fibers which are commonly associated with the glass strands of the prior art are virtually eliminated. Moreover, the glass concentrate capsules of the present invention can be used to prepare composites with improved physical properties such as lower water absorption, higher impact strength, higher tensile strength, higher modulus, improved elongation and heat distortion properties. Furthermore, these improved properties are obtained through a more economical process.

DESCRIPTION OF THE DRAWINGS

FIG. 1 shows a typical glass strand which comprises a bundle of microfibers bound together by a sizing agent.

FIG. 2 shows a typical assembly of glass strands of the prior art which is prepared by coating a polymer onto a plurality of endless glass strands and then cutting the resulting coated assembly of strands to the desired length. Note that the ends of the microfibers are exposed providing sites for debundling.

FIG. 3 illustrates encapsulated single strands of the prior art where the glass strand is saturated with monomer which is then polymerized in situ.

FIG. 4 is a plan view of a glass concentrate capsule of the present invention.

FIG. 4A is a front view of the capsule shown in FIG. 4 with the top of the capsule cut away to expose the ends of the glass strands. Note that the glass strands are aligned in a collimated array which allows a very close packing of the strands to provide a high concentration of glass within the capsule.

FIG. 5 is a plan of another type of glass concentrate capsule prepared according to the present invention.

FIG. 5A is a top view of the capsule shown in FIG. 5. In this view the top has been cut away to expose the ends of the glass strands. Once again note that the glass strands are aligned in a collimated array which allows a very close packing of the strands to provide a high concentration of glass within the capsule.

FIG. 6 is a plan view of another type of glass concentrate capsule which is prepared according to the processes of the present invention. This particular configuration is in the form of a flat tape as opposed to the rounded capsules illustrated in FIGS. 4A and 5A.

FIG. 6A is a top view of the capsule shown in FIG. 6. Once again note that the glass strands are aligned in a collimated array which allows a very close packing of the strands to provide a high concentration of glass within the capsule.

DESCRIPTION OF THE PREFERRED EMBODIMENTS

The glass concentrate capsules of the present invention are prepared by encapsulating the glass strands in a resin matrix by in situ polymerization of the monomers using a critical amount of protective colloid and a critical type of agitation.

In the practice of the present invention from 10 to 80 parts by weight glass strands are encapsulated in a collimated array within from 20 to 90 parts by weight of a thermoplastic resin, based on 100 parts by weight total of glass and resin. The glass concentrate capsules are prepared by suspension polymerization of monomer in the presence of glass fibers using a critical amount of protective colloid and a critical type of agitation. The polymerization is carried out under conditions where there is preferential wetting of the glass fibers by the monomers. This preferential wetting is readily accomplished by first wetting the glass fibers with monomer followed by suspension polymerization. When using those monomers, e.g. vinyl chloride and others, which can easily displace water in the glass strands, the glass may be first wet with water followed by the addition of monomer.

The amount of water used will vary of from 100 to 1600 parts by weight, based on 100 parts by weight total of the glass and monomer. Larger quantities of water can be used but no advantage is gained. The amount of protective colloid used in critical and must be determined for each system. In general, the amount of the protective colloid used will fall in the range of from 0.05 to 2.0% by weight based on the total weight of the glass and monomer.

During the polymerization step the glass strands which are impregnated and coated with monomer align themselves and are subsequently encapsulated by the resulting resin matrix. The glass fibers in the capsules are normally aligned in a substantially collimated array to form cylinders or flat tapes in which the glass strands are butted end to end. The length of the capsules is generally slightly greater than the length of the original chopped strands. The microfibers which form the glass strands are also surrounded by and imbedded in the polymer matrix.

The glass component used in the present invention are strands of glass fibers which vary in length from 1/32 inch to 3/4 inch or longer. Preferably, the glass strands are about 1/8 inch to 1/4 inch long and about 1/16 inch to 3/16 inch wide. The glass strands are preferably sized with material which will become swollen in the monomers used to form the resin matrix without dissolving in the monomers. Moreover, the monomers and the polymers formed therefrom should be compatible with the size used in order to insure that the polymers will have sufficient adhesion to the glass strands.

In general any monomer which is polymerizable to a thermoplastic resin is used to form the resin matrix. Examples of monomers which are polymerizable to thermoplastic resins which may be employed in the practice of this invention include vinyl chloride and alkenyl aromatic monomers of the general formula

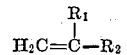

wherein $R_1$ is hydrogen, chlorine or methyl and $R_2$ is an aromatic radical of 6 to 10 carbon atoms which may also contain substituents such as halogens and alkyl groups attached to the aromatic nucleus, e.g., styrene, alpha methylstyrene, vinyl toluene, alphachlorostyrene, orthochlorostyrene, para-chlorostyrene, methchlorostyrene, ortho-methyl styrene, para-methylstyrene, ethylstyrene, isopropyl styrene, dichlorostyrene, vinylnaphthalene, etc.

Other suitable monomers would include vinylidene monomers corresponding to the general formula:

Examples of these vinylidene monomers would include acrylonitrile, methacrylonitrile, acrylic acid, methacrylic acid, alkyl acrylates, and alkylmethacrylates, wherein the alkyl group contains from 1 to 12 carbon atoms such as methylmethacrylate, methyl acrylate, ethyl acrylate, propyl acrylate; and other vinylidene monomers such as are known to those skilled in the art.

Another group of monomers suitable for use in the practice of the present invention would include monomers of the general formula:

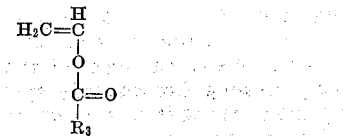

wherein $R_3$ is selected from the group comprising hydrogen, alkyl groups of from 1 to 10 carbon atoms, aryl groups of from 6 to 10 carbon atoms including the carbon atoms in ring substituted alkyl substituents; e.g., vinyl formate, vinyl acetate, vinyl propionate, vinyl benzoate, and the like.

Similar to the foregoing and equally useful are the vinyl ether type monomers of the general formula:

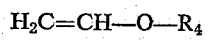

wherein $R_4$ is an alkyl group of from 1 to 8 carbons, an aryl group of from 6 to 10 carbons, or a monovalent aliphatic radical of from 2 to 10 carbon atoms, which aliphatic radical may be hydrocarbon or oxygen containing, i.e., an aliphatic radical with ether linkages, and may also contain other substituents such as halogen, carbonyl, etc.

Examples of these vinyl ethers include vinylmethyl ether, vinyl ethyl ether, vinyl n-butyl ether, vinyl 2-chloroethyl ether, vinyl phenyl ether, vinyl isobutyl ether, vinyl chlorohexyl ether, p-butylcyclohexyl ether, vinyl ether of p-chloro-phenyl glycol, etc.

In addition the present invention also contemplates the use of suitable combinations of the foregoing monomers and the use of a suitable rubber component in combination with the foregoing monomers. This rubbery component would include butadiene, neoprene, nitrile rubbers, polyisoprene, polyisobutylene, natural rubbers, acrylonitrile/butadiene/styrene, chlorinated polyethylene, ethylene vinyl acetate copolymers, propylene oxide rubbers, etc. These would include polyblends, graft copolymers and physical admixtures of a rubbery component with the monomers used to encapsulate the glass. Rubbery compositions are well known to those skilled in the polymer art and need no further explanation here. Also, the glass strands used in the practice of the present invention can first be impregnated with a rubber and then encapsulated.

The preferred monomers for use in the present invention are styrene, methyl methacrylate and acrylonitrile. Especially preferred are the use of comonomeric systems such as styrene-acrylonitrile and styrene-acrylonitrile-methacrylic acid. In these especially preferred systems the amounts of comonomers can be varied over very wide ranges as is well known to those skilled in the art.

Preferential wetting of the glass strands by the monomers is a necessary requirement for successful collimation and encapsulation. If the glass fibers are not wetted by the monomers the resulting polymer scarcely coats the glass. Consequently, only single glass strands are encapsulated and collimation of a plurality of strands does not take place. Moreover, preferential wetting of the glass with monomer encourages impregnation of the glass strands by the monomer which is adsorbed on the microfibers by capillary action. Thus, following polymerization, the individual microfibers as well as the aligned strands are fully surrounded and protected by the resin matrix. Variation in the sizes and shapes of the glass concentrate capsules can be obtained by controlling the polymerization conditions.

The role of the protective colloid in this invention is very important and certain critical requirements must be met. The choice of protective colloid and the amount used depends on factors such as the length of glass strands, the monomers used for encapsulation, the ratio of glass to monomers and the ratio of water to monomers. The optimum amount of protective colloid is dictated by the size, shape and uniformity desired in the resulting glass concentrate capsule.

In general, when excessive protective colloid is used there is no aligning of the glass strands into a collimated array and only a thin coating of polymer is found on the individual strands. Most of the polymer will be present as fine suspension beads or powders. When insufficient protective colloid is used there is no aligning of glass strands into a collimated array. Moreover, the polymer forms into oversized beads or else complete coagulation occurs. When using an optimum amount of protective colloid, the glass strands are individually coated with polymer and are aligned and butted end-to-end in a substantially collimated array to form capsules which pass through a number 2.5 U.S. Standard Screen and are retained on number 40 screen. Moreover, when using optimum amounts of protective colloid there are little or no polymer fines which indicate that substantially all of the monomer is polymerized around the glass strands.

Examples of protective colloids for use in the present invention include those synthetic and naturally occurring material which are well known to those skilled in the art. These include polyvinyl alcohol, partially hydrolyzed polyvinyl acetate, soluble starch, soluble starch derivatives, dextrin, gum tragacanth, gum arabic, gum acacia, gum tragon, gelatin, agar-agar, methyl cellulose, methylhydroxypropyl cellulose, ethylhydroxyethyl cellulose, sodium alginate, sodium silicate, tricalcium phosphate, salts of polycarboxylic acids such as the sodium salts of polyacrylic acid, partial esters of polymethacrylic acid, copolymers of acrylic acid and 2-ethyl hexyl acrylate, copolymers of vinylacetate and maleic anhydride and the like.

Especially preferred protective colloids include polyvinyl alcohol, partially hydrolyzed polyvinyl acetate, bentonite, methyl cellulose, partial esters of polymethacrylic acid and copolymers of acrylic acid and 2-ethyl hexyl acrylate which are described in U.S.P. 2,945,013 and copolymers of vinyl acetate maleic anhydride.

The amount of protective colloid used is very critical and must be determined for each individual system. The amount of protective colloid used will vary with the specific protective colloid as well as with the amount of glass, monomer and water used in the polymerization step. The length of the glass strands and the type of monomers are other factors which determine the amount of protective colloid used. In this regard it should be noted that larger concentrations of suspending agents are required with longer glass strands and with decreasing monomer/glass ratio.

As a general rule, the amount of protective colloid used will be in the range of from .05 to 2.0% by weight based on the total weight of monomer and glass. Within this range the optimum amount for a given system must be determined by the nature of the other components in the system as well as by the amount of these components. Those skilled in the art will be readily able to determine the optimum amount of protective colloid required for any given system from the teachings set forth in the working examples.

The amount of water used in the polymerization process will vary depending on the weight of the glass and monomers. In general, the amount of water will vary from 100 to 1600 parts by weight, based on one hundred parts by weight of the glass and monomer. In the especially preferred process, where the monomer is present in amounts of from 30 to 80 parts by weight based on a total of 100 parts by weight of glass and monomer, the amount of water used will vary from 100 to 600 parts by weight based on a total of 100 parts by weight of glass and monomer.

The type of agitation used during the polymerization of the monomers is also very critical. Encapsulation and collimation of the fibers is only successfully achieved when using low shear agitation of the type that causes the whole mass to move without causing localized high shear agitation. Attempts to encapsulate glass fibers in an agitated Pfaudler type reaction generally results in considerable debundling of the glass strands with formation of individual fibers which tended to form matted balls and which interfere with the collimation. Suitable agitation may be achieved by tumbling the reactor end-to-end, or in those types of horizontal reactors where the entire mass is moved in a cascading type motion.

In the preferred polymerization process of this invention, conventional polymerization initiators and chain transfer agents are used. However, it should be noted that the use of these materials is optional and that the polymerization step may be carried out using heat alone without any polymerization initiator.

The polymerization step is carried out at temperatures of from 0° C. to 150° C. using pressure vessels if necessary. The preferred polymerization temperature is in the range of from 40 to 90° C. The polymerization step is carried out until a substantial amount of monomer is converted to polymer. The time required will depend on the particular system and polymerization conditions used as well as on the degree of conversion desired.

The glass concentrate capsules of the present invention comprise from 10 to 80% by weight of glass. More preferably, the capsules comprise from 20 to 70% by weight of glass. Conversely, the capsules comprise from 20 to 90% by weight of thermoplastic resin matrix. More preferably, the capsules comprise from 30 to 80% by weight of resin.

The preferred glass concentrate capsules of the present invention are those which pass through a number 2.5 U.S. Standard Screen and which are retained on a number 40 U.S. Standard Screen. The more preferred glass concentrate capsules are those that pass through a number 4 screen and which are retained on a number 20 screen.

The glass concentrate capsules weigh about 10 to 350 times more than the average weight of one of the original glass strands used as the starting material. The preferred glass concentrate capsules weigh about 20 to 150 times more than the average weight of one of the original glass strands.

Preferably, at least five (5) to ten (10) glass strands are encapsulated in the glass concentrate capsules of the present invention. As stated above, these are encapsulated in a substantially collimated array within a thermoplastic matrix. The substantially collimated array allows close packing of the glass strands which, in turn, provides a capsule with a high concentration of glass.

The final size, shape and composition of the glass concentrate capsules will depend on the particular system and polymerization conditions used. These properties will be dictated by the particular end use requirements. In general, the capsules are prepared so that they can be blended with a diluent thermoplastic matrix in the form of powder, beads or extruded chips, without encountering problems of segregation or non-uniformity.

The following examples are set forth in illustration of this invention and should not be construed as a limitation thereof. Unless otherwise indicated, all parts and percentages given are by weight.

EXAMPLE 1

This example illustrates the preparation of glass concentrate capsules containing about 20 weight percent of glass strands arranged in a collimated array within a styrene-acrylonitrile polymer matrix. The following charge is used in this example:

| Parts by weight: | Ingredient |
| --- | --- |
| 20 | Chopped glass strands ⅛ inch long. |
| 59 | Styrene. |
| 21 | Acrylonitrile. |
| 133 | Water. |
| 0.125 | Protective colloid. |
| 0.4 | Benzoyl peroxide. |
| 0.24 | Terpinolene. |

The chopped glass strands (Johns-Manville CS–308) are charged to a reactor and the entrapped air is removed by purging with nitrogen. The styrene and acrylonitrile are purged with nitrogen and then mixed with the benzoyl peroxide and the terpinolene chain transfer agent and the mixture is then charged to the reactor under a nitrogen purge. The reactor is then sealed and rotated to completely wet the glass with monomer. After the glass is completely wet by the monomer, nitrogen purged distilled water is charged to the flask along with the protective colloid. The protective colloid used is a copolymer comprising 95.5 mol percent acrylic acid and 4.5 mol percent 2-ethylhexyl acrylate prepared according to the teaching of U.S.P. 2,945,013. This colloid is charged to the reactor as a 2% aqueous solution. The reactor is then sealed and rotated end-over-end in a thermostatically controlled water bath at 75° C. for 16 hours. The resulting capsules are then discharged onto a screen and washed with cold and hot water. There is no evidence of polymer agglomeration and there are very few fine polymer particles indicating that substantially all of the monomer has polymerized around the glass fibers.

The resulting glass concentrate capsules pass through a 2.5 U.S. Standard Screen and are retained on a 40 screen. These capsules weigh 30 to 110 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

EXAMPLE 2

This example illustrates that collimation of the glass strands does not occur when the amount of the polymeric protective colloid used in Example 1 falls below a certain critical level.

Example 1 is repeated here except that the amount of protective colloid is reduced to 0.052 part. During the course of the polymerization reaction agglomeration of monomer-polymer occurs and no glass concentrate capsules are obtained.

EXAMPLE 3

This example illustrates that collimation of the glass strands does not occur when the amount of the polymeric protective colloid used in Example 1 is above a certain critical level.

Example 1 is repeated here except that the amount of protective colloid is increased to 0.40 part. After a 16 hour polymerization time, the contents of the bottle are discharged onto a screen. An examination of the solids shows fine polymer particles totally devoid of glass together with lightly coated glass strands. There is substantially no collimation of glass strands into capsules.

EXAMPLE 4

This example illustrates the use of bentonite as a protective colloid in preparing glass concentrate capsules which contain about 20 weight percent of glass strands arranged in a collimated array within a styrene-acrylonitrile polymer matrix.

Example 1 is repeated here except that 0.30 part of bentonite is used as the protective colloid. The bentonite used is further identified as Bentonite KWK which is obtained from the American Colloid Company. This material is charged to the bottle as a 3.5% solution wherein the pH is adjusted to 6 by the addition of 0.5 N sulfuric acid.

The resulting glass concentrate capsules are comparable to those obtained in Example 1.

EXAMPLE 5

This example illustrates that collimation of the glass strands does not occur when the amount of bentonite used in Example 4 falls below a certain critical level.

Example 4 is repeated here except that the amount of bentonite is reduced to 0.20 part. During the course of the polymerization reaction agglomeration of monomer-polymer occurs and no glass concentrate capsules are obtained.

EXAMPLE 6

This example illustrates that collimation of the glass strands does not occur when the amount of bentonite used in Example 4 is above a certain critical level.

Example 4 is repeated here except that the amount of bentonite is increased to 0.50 part. After a 16 hour polymerization time the contents of the bottle are discharged onto a screen. An examination of the solids shows fine polymer particles totally devoid of glass together with es-

EXAMPLE 7

This example illustrates the preparation of glass concentrate capsules containing about 50% by weight of ⅛ inch glass strands arranged in a collimated array within a styrene-acrylonitrile polymer matrix.

Example 1 is repeated here except that the following quantities are used:

50 parts of ⅛ inch chopped glass strands
37 parts of styrene
13 parts of acrylonitrile
260 parts of water
0.30 part of protective colloid (the interpolymer of acrylic acid and 2-ethyl hexylacrylate used in Example 1)
0.25 part of benzoyl peroxide
0.15 part of terpinolene The resulting glass concentrate capsules pass through a number 4 U.S. Standard Screen and are retained on a number 16 screen. These capsules weigh 30 to 200 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are placed in a muffle furnace in order to burn off the polymer exposing a plurality of glass strands in a substantially collimated array.

EXAMPLE 8

This example illustrates that collimation of the glass strands does not occur when the amount of the polymeric protective colloid used in Example 7 falls below a certain critical level.

Example 7 is repeated here except that the amount of protective colloid is reduced to 0.10 part. During the course of the polymerization reaction agglomeration of monomer-polymer occurs and no glass concentrate capsules are obtained.

EXAMPLE 9

This example illustrates that collimation of the glass strands occurs only to a very limited extent when the amount of the polymeric protective colloid used in Example 1 is above a certain critical level.

Example 7 is repeated here except that the amount of protective colloid is increased to 0.5 part. After a 16 hour polymerization time the contents of the bottle are discharged onto a screen. An examination of the solids shows fine polymer particles totally devoid of glass together with lightly coated glass strands. There is only very little collimation of glass strands into capsules.

EXAMPLE 10

This example illustrates the use of bentonite as a protective colloid in preparing a glass concentrate capsule which contains about 50% by weight of glass strands arranged in a collimated array within a styrene-acrylonitrile polymer matrix.

Example 7 is repeated here except that 1.0 part of the bentonite of Example 4 is used as the protective colloid.

The resulting glass concentrate capsules are comparable to those obtained in Example 7.

EXAMPLE 11

This example illustrates that collimation of the glass strands does not occur when the amount of bentonite used in Example 10 falls below a certain critical level.

Example 10 is repeated here except that the amount of bentonite is reduced to 0.70 part. During the course of the polymerization reaction agglomeration of monomer-polymer occurs and no glass concentrate capsules are obtained.

EXAMPLE 12

This example illustrates that collimation of the glass strands does not occur when the amount of bentonite used in Example 10 is above a certain critical level.

Example 10 is repeated here except that the amount of bentonite is increased to 2.0 parts. After a 16 hour polymerization time the contents of the bottle are discharged onto a screen. An examination of the solids shows fine polymer particles totally devoid of glass together with lightly coated glass strands. There is very little collimation of glass strands into capsules.

EXAMPLE 13

This example illustrates the preparation of glass concentrate capsule containing about 20 weight percent of ⅛ inch glass strands arranged in a collimated array within a styrene polymer matrix.

The general procedures of Example 1 are repeated here except that the polymerization is carried out without a chain transfer agent and the following quantities are used.

20 parts of ⅛ inch chopped glass strands
80 parts of styrene
200 parts of distilled water
0.15 part of protective colloid (the interpolymer of acrylic acid and 2-ethyl hexylacrylate used in Example 1)
0.24 part of benzoyl peroxide The resulting glass concentrate capsules pass through a number 2.5 U.S. Standard Screen and are retained on a number 12 screen. These capsules weigh 40 to 300 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are placed in a muffle furnace in order to burn off the polymer exposing a plurality of glass strands in a substantially collimated array.

EXAMPLE 14

This example illustrates that collimation of the glass strands does not occur when the amount of the polymeric protective colloid used in Example 13 falls below a certain critical level.

Example 13 is repeated here except that the amount of protective colloid is reduced to 0.075 part. During the course of the polymerization reaction agglomeration of monomer-polymer occurs and no glass concentrate capsules are obtained.

EXAMPLE 15

This example illustrates that collimation of the glass strands does not occur when the amount of the polymeric protective colloid used in Example 13 is above a certain critical level.

Example 13 is repeated here except that the amount of protective colloid is increased to 0.60 part. After a 16 hour polymerization time the contents of the bottle are discharged onto a screen. An examination of the solids shows fine polymer particles totally devoid of glass together with lightly coated glass strands. There is substantially no collimation of glass strands into capsules.

EXAMPLE 16

This example illustrates the use of bentonite as a protective colloid in preparing a glass concentrate capsule containing about 50% by weight of glass strands arranged in a collimated array within a styrene polymer matrix.

Example 13 is repeated here except that 0.50 part of the bentonite of Example 1 is used as the protective colloid.

The resulting glass concentrate capsules are comparable to those obtained in Example 13.

EXAMPLE 17

This example illustrates that collimation of the glass strands does not occur when the amount of bentonite used in Example 16 falls below a certain critical level.

Example 16 is repeated here except that the amount of bentonite is reduced to 0.20 part. During the course of the polymerization reaction agglomeration of monomer-polymer occurs and no glass concentrate capsules are obtained.

EXAMPLE 18

This example illustrates that collimation of the glass strands does not occur when the amount of bentonite used in Example 16 is above a certain critical level.

Example 16 is repeated here except that the amount of bentonite is increased to 2.0 part. After a 16 hour polymerization time the contents of the bottle are discharged onto a screen. An examination of the product shows that substantially no collimation has taken place.

EXAMPLE 19

This example illustrates the preparation of glass concentrate capsule containing about 50 weight percent of ⅛ inch glass strands arranged in a collimated array within a styrene-acrylonitrile-methacrylic acid polymer matrix.

Example 7 is repeated here except that the following quantities are used:

50 parts of ⅛ inch chopped glass strands
36 parts of styrene
13 parts of acrylonitrile
1 part of methacrylic acid
262 parts of water
0.125 part of protective colloid (the interpolymer of acrylic acid and 2-ethyl hexylacrylate used in Example 1)
0.25 part of benzoyl peroxide
0.15 part of terpinolene The resulting glass concentrate capsules pass through a number 2.5 screen and are retained on a number 40 screen. These capsules weigh 30 to 80 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are placed in a muffle furnace in order to burn off the polymer exposing a plurality of glass strands in a substantially collimated array. Note that the presence of the methacrylic acid monomer allows the use of smaller amounts of protective colloid while still giving a collimated product.

EXAMPLE 20

This example illustrates that collimation of the glass strands does not occur when the level of protective colloid used in Example 19 falls below a certain critical level.

Example 19 is repeated here except that the amount of protective colloid is reduced to 0.05 part. During the course of the polymerization reaction agglomeration of monomer-polymer occurs and no glass concentrate capsules are obtained.

EXAMPLE 21

This example illustrates that collimation of the glass strands does not occur when the amount of bentonite used in Example 19 is above a certain critical level.

Example 19 is repeated here except that the amount of protective colloid is increased to 0.50 part. After a 16 hour polymerization time the contents of the bottle are discharged onto a screen. An examination of the solids shows fine polymer particles totally devoid of glass together with slightly coated glass strands. There is essentially no collimation of glass strands in glass concentrate capsules.

EXAMPLE 122

This example illustrates the use of 0.4 part of a polyvinyl alcohol protective colloid in the preparation of a glass concentrate capsule containing about 50% by weight of glass strands aligned in a collimated array within a styrene-acrylonitrile polymer matrix. The partially hydrolyzed polyvinyl alcohol has a residual acetate content of 30% by weight and a 4% aqueous solution viscosity at 20° C. of 22 centipoises.

The charge and procedure of Example 7 is repeated here. The resulting product is comparable to the glass concentrate capsules obtained in Example 7.

EXAMPLE 23

This example illustrates the use of 0.3 part of an interpolymer of 93 mole percent acrylic acid and 7 mole percent 2-ethylhexyl acrylate as the protective colloid in preparing glass concentrate capsules containing about 50% by weight of glass strands aligned in a collimated array with a polymer matrix which is a copolymer of 50% by weight of styrene and 50% by weight of methyl methacrylate.

The charge and procedure of Example 7 is repeated here. The resulting product is comparable to the glass concentrate capsules obtained in Example 7.

EXAMPLE 24

This example illustrates the use of 0.17 part of the protective colloid used in Example 1 in the preparation of glass concentrate capsules containing about 50% by weight of glass strands aligned in a collimated array within a polymer matrix which is a terpolymer of 71% styrene/25% acrylonitrile/4% methacrylic acid. Except for the difference in monomers the charge and procedure of Example 19 is repeated here. The resulting product is comparable to the glass concentrate capsules obtained in Example 19. Once again note that the use of methacrylic acid as a comonomer allows the use of lower amounts of the protective colloid.

EXAMPLE 25

This example illustrates the use of concentrate capsules using ¼ inch chopped glass strands. The general procedure of Example 1 is followed here except that the following quantities are used.

20 parts of ¼ inch chopped glass strands
59 parts of styrene
21 parts of acrylonitrile
200 parts of water
0.25 part of protective colloid (the interpolymer of acrylic acid and 2-ethyl hexylacrylate used in Example 1)
0.40 part of benzoyl peroxide
0.24 part of terpinolene The resulting glass concentrate capsules pass through a number 4.0 screen and are retained on a number 20 screen. These capsules weigh 30 to 90 times more than the average weight of the ⅛ inch glass strands which are used as the starting material. Examination of a cross section of representative capsules shows a plurality of glass strands each encapsulated by polymer.

Other representative capsules are placed in a muffle furnace in order to burn off the polymer exposing a plurality of glass strands in a substantially collimated array.

The following Examples 26 to 28 show the necessity of prewetting the glass strands with monomer in order to obtain a glass concentrate capsule wherein the glass strands are in a collimated array within a thermoplastic resin matrix.

EXAMPLE 26

Example 1 is repeated here except that the water is charged to the bottle prior to charging the styrene and acrylonitrile monomers. Consequently, the glass fibers are first wet with water rather than by monomer. The polymerization step is then carried out as in Example 1. An examination of the resulting product shows that essentially no collimation and encapsulation of glass strands has taken place. There is a thin polymer layer around individual glass strands and many fine polymer particles which do not contain glass strands.

EXAMPLE 27

This example uses the charge and general procedure of Example 4 except that the glass strands are first wet with water which is then followed by addition of the styrene and acrylonitrile monomers. The resulting product is comparable to that obtained in Example 26 in that there are many fine polymer particles and that essentially no collimation of the glass strands takes place.

EXAMPLE 28

This example uses the charge and general procedures of Example 19 except that the water is used to wet the glass fibers prior to the addition of the styrene, acrylonitrile and methacrylic acid monomers. The resulting product is comparable to that obtained in Example 27 in that there are many fine polymer particles and that essentially no collimation of the glass strands takes place.

The following Examples 29 to 40 illustrate the critical requirement of using low shear agitation wherein the whole suspension polymerization mass moves while avoiding localized high shear agitation. The apparatus used in these examples is conventional for suspension polymerization and is well known to those skilled in the art. Here the polymerization reaction is carried out in a 1300 cc. glass reactor which is 4 inches in diameter and 7½ inches deep. The reactor is equipped with a four-neck glass dome, a long reflux condenser, a 5/16 inch steel thermowell baffle, an agitator and a nitrogen inlet. A heating mantle attached to a variac and Leeds Northrup temperature controller serve to maintain temperature at about 75° C. by means of a thermocouple inserted into the baffle. Both anchor and Pfaudler type agitator blades are used in these examples.

Except for the differences in the reactors, the general polymerization procedures used above are followed here. The glass is charged to the reactor first and then completely wet with monomer prior to adding the water and protective colloid. A nitrogen purge is maintained during the charging and polymerization steps. Nitrogen purged monomer and water are used.

EXAMPLES 29 TO 34

In these examples the agitator used is a flat faced anchor agitator having a diameter of 3½ inches and a ½ inch face. Those skilled in the art will readily recognize this agitator as being of a type conventionally used in polymerization reactions. In these examples the agitator is run at 200 r.p.m. which is determined to be optimum in order to prevent debundling of the glass strands. However, at this speed there is insufficient turbulence and the glass could not be adequately dispersed. Consequently, there is no encapsulation and collimation of the glass. A summary of the charges used in these examples is set forth in Table 1.

TABLE I.—SUMMARY OF EXAMPLES 29 TO 34

| Ingredients¹ | Example |  |  |  |  |  |
|---|---|---|---|---|---|---|
|  | 29 | 30 | 31 | 32 | 33 | 34 |
| Glass strands ⅛ inch long | 20 | 20 | 20 | 20 | 20 | 20 |
| Styrene | 59 | 59 | 59 | 59 | 59 | 59 |
| Acrylonitrile | 21 | 21 | 21 | 21 | 21 | 21 |
| Water | 133 | 300 | 450 | 133 | 300 | 450 |
| Colloid: |  |  |  |  |  |  |
| A | 0.125 | 0.2 | 0.6 |  |  |  |
| B |  |  |  | 0.3 | 0.4 | 0.6 |
| Benzoyl peroxide | 0.4 | 0.4 | 0.4 | 0.4 | 0.4 | 0.4 |
| Terpinolene | 0.24 | 0.24 | 0.24 | 0.24 | 0.24 | 0.24 |

¹ Amounts given in parts by weight.
NOTE.—Colloid A is the interpolymer of acrylic acid and 2-ethylhexy acrylate used in Example 1; Colloid B is the bentonite used in Example 4

The foregoing Examples 29 to 34 are repeated except that a ¾ inch diameter anchor agitator having curved 1 inch wide blades with a slight twist reaching to the top of the liquid is used. Once again an agitator speed of 200 r.p.m. was determined to be optimum to prevent debundling of the glass strands. No improvement in dispersing the monomer/glass slurry is observed and there is no encapsulation and collimation of the glass.

The foregoing Examples 29 to 34 are again repeated except using a Pfaudler type agitator which is 3½ inches in diameter. The agitator used has three flat faced blades ⅝ inch high. When run at 500 to 600 r.p.m. this agitator gives excessive agitation which causes shearing and debundling of the glass strands. The result is large quantities of matted glass in the reaction and no collimation takes place. When the agitator is run at speeds which do not cause shearing and debundling of the glass strands, there is insufficient dispersion of the glass and no encapsulation and collimation takes place.

EXAMPLES 35 TO 40

In these examples the general procedures of Examples 29 to 34 are repeated except that a Pfaudler type agitator which is 3 inches in diameter is used. The agitator is a three-fingered retreating blade type with blades ⅜ inch wide. The slurry is adequately dispersed without excessive shearing of the glass strands by placing the retreating blades close to the bottom of the reactor, and running the agitator in the range of from 220–550 r.p.m. Examination of the resulting product from each example indicates that there is some coating of some of the individual glass strands. However, no collimation is observed to take place. There is also substantial amounts of matted glass balls and finely dispersed polymer. A summary of the charges used in these examples is set forth in the following Table II.

TABLE II.—SUMMARY OF EXAMPLES 35 TO 40

| Ingredients (parts by weight) | Example— |  |  |  |  |  |
|---|---|---|---|---|---|---|
|  | 35 | 36 | 37 | 38 | 39 | 40 |
| Glass strands ⅛ inch long | 45 | 45 | 45 | 75 | 30 | 20 |
| Styrene | 33.2 | 33.2 | 32.4 | 54 | 43.2 | 59 |
| Acrylonitrile | 11.8 | 11.8 | 11.7 | 19.5 | 15.6 | 21 |
| Methacrylic acid |  |  |  | 0.9 | 1.5 | 1.2 |
| Water | 600 | 600 | 600 | 600 | 600 | 133 |
| Colloid A | 0.27 | 0.45 | 0.135 | 0.18 | 0.18 | 1.125 |
| Benzoyl peroxide | 0.22 | 0.22 | 0.22 | 0.37 | 0.30 | 0.4 |
| Terpinolene | 0.13 | 0.13 | 0.13 | 0.22 | 0.18 | 0.24 |
| R.p.m. of agitator | 220 | 550 | 550 | 330 | 220 | 220 |

NOTE.—Colloid A is the interpolymer of acrylic acid and 2-ethylhexyl acrylate used in Example 1.

The use of conventional suspension polymerization equipment and procedures causes shearing and debundling of the glass fibers. The resulting matted glass balls are especially undesirable as they cause disruption of the system. Moreover, collimation of the glass strands does not occur when using conventional suspension type polymerization. Successful collimation is only found to occur with low shear agitation of the type which causes the whole suspension polymerization mass to move while avoiding locallized high shear agitation. Examples of suitable type agitation include the cascading type of agitation that occurs when the reactor is tumbled end-over-end as in Example 1 and that which occurs in liquid-solid blenders, conical blenders, ball mills, and horizontal type reactors. These reactors are well known to those skilled in the art and need no further description here.

EXAMPLE 41

This example illustrates the use of a prepolymer syrup in the preparation of glass concentrate capsules. The charge and procedure of Example 1 is repeated here except that the monomers used in Example 1 are prepolymerized to about 15% conversion. This prepolymer syrup is then used to wet the glass and the polymerization reaction is carried out as in Example 1 except that 0.3 part of protective colloid is used. This larger amount of colloid is found to be necessary when using a prepolymer syrup. The resulting glass concentrate capsules are comparable to those prepared in Example 1.

The following Examples 42 to 44 illustrate the use of termonomers which are capable of interacting with the surface of the glass to improve adhesion of the glass to the matrix. In each example the glass used is commercially available glass strands ⅛ inch long which have been sized with polyvinyl acetate. The general polymerization procedure of Example 1 is repeated here except that the reaction is carried out in a horizontal reactor using 600 parts of water. In each example the resulting products are glass concentrate capsules which are comparable to those obtained in Example 1. The charges used in these examples are tabulated in the following Table III.

TABLE III.—SUMMARY OF CHARGES USED IN EXAMPLES 42 TO 44

| Ingredient | Examples— | | |
|---|---|---|---|
| | 42 | 43 | 44 |
| Chopped glass strands | 80 | 80 | 80 |
| Styrene | 56.8 | 56.0 | 56.8 |
| Acrylonitrile | 12.0 | 12.0 | 12.0 |
| Methacrylic acid | 3.2 | | |
| Para-vinyl benzyl alcohol | | 4.0 | |
| 4-vinyl pyridine | | | 3.2 |
| Colloid | 0.125 | 0.125 | 0.125 |
| Benzoyl peroxide | 0.4 | 0.4 | 0.4 |
| Terpinolene | 0.24 | 0.24 | 0.24 |

EXAMPLE 45

This example illustrates the preparation of glass concentrate capsules which contain about 30% by weight of glass strands arranged in a collimated array within a vinyl chloride polymer matrix. The following charge is used in this example:

Ingredients: Parts by weight
    Chopped glass strands ⅛ inch long _____ 15
    Vinyl chloride _____ 40
    Water _____ 80
    Methyl cellulose _____ 0.18
    Lauroyl peroxide _____ 0.12

The chopped glass strands (Johns-Manville CS–308) are charged to a reactor and the entrapped air is removed by purging with nitrogen. The vinyl chloride monomer is then charged to the reactor under a nitrogen purge. The reactor is then sealed and rotated to completely wet the glass with monomer. After the glass is completely wet by the monomer, nitrogen purged, distilled water is charged along with the methyl cellulose. The methyl cellulose used as the protective hydroxypropylmethyl cellulose ether, which is available commercially as Methocel 90 HG. This material which has a viscosity of about 4000 cps. is prepared by etherification of from 85 to 90% of the available cellulose hydroxyl groups with methyl and hydroxy propyl groups. The reactor is then sealed and rotated end-over-end in a thermostatically controlled water bath at 54° C. for 16 hours. The resulting capsules are then discharged onto a screen and washed with cold and hot water. There is only slight evidence of polymer agglomeration and there are only a few fine polymer particles indicating that most of the monomer has polymerized around the glass fibers.

The resulting glass concentrate capsules which contain about 30% by weight of glass, pass through a 2.5 U.S. Standard Screen and are retained on a 40 screen. These capsules weigh 5 to 30 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

EXAMPLE 46

Example 45 is repeated here except that the amount of methyl cellulose is reduced to 0.12 part. The resulting glass concentrate capsules are comparable to those obtained in Example 45.

EXAMPLE 47

Example 46 is repeated here except that the amount of methyl cellulose is increased to 0.24 part. The resulting glass concentrate capsules are comparable to those obtained in Example 46.

EXAMPLE 48

This example illustrates that collimation of the glass strands does not occur when the amount of the methyl cellulose protective colloid used in Examples 45 to 47 falls below a certain critical level.

Example 45 is repeated here except that the amount of protective colloid is reduced to 0.04 part. During the course of the polymerization reaction agglomeration of monomer-polymer occurs and no glass concentrate capsules are obtained.

EXAMPLE 49

This example illustrates that collimation of the glass strands does not occur when the amount of the polymeric protective colloid used in Examples 45 to 47 is above a certain critical level.

Example 45 is repeated here except that the amount of protective colloid is increased to 0.45 part. After a 16 hour polymerization time, the contents of the bottle are discharged onto a screen. An examination of the solids shows fine polymer particles totally devoid of glass together with lightly coated glass strands. There is substantially no collimation of glass strands into capsules.

EXAMPLE 50

This example illustrates the prewetting of the glass with water followed by charging of the monomer to the reaction vessel.

Example 45 is repeated here except that the glass strands are first wet with water followed by charging of the monomers. The resulting glass concentrate capsules are comparable to those obtained in Example 45, except that the glass content is about 27% by weight.

EXAMPLE 51

Example 50 is repeated here except that 0.10 part of methyl cellulose is used. The resulting glass concentrate capsules are comparable to those obtained in Example 50.

EXAMPLE 52

Example 50 is repeated here except that 0.28 part of methyl cellulose is used. The resulting glass concentrate capsules are comparable to those obtained in Example 50.

EXAMPLE 53

This example is set forth to illustrate the preparation of glass concentrate capsules containing about 43% by weight of glass. The following charge is used:

Ingredient: Parts by weight
    Chopped glass strands ⅛ inch long _____ 25
    Vinyl chloride _____ 40
    Water _____ 120
    Methyl cellulose _____ 0.30
    Lauroyl peroxide _____ 0.12

The general polymerization procedure of Example 45 is repeated here except that the vinyl chloride monomer is charged after the glass has been wet with the water. The resulting capsules are then discharged onto a screen and washed with cold and hot water. There is only slight evidence indicating that most of the monomer has polymerized around the glass fibers.

The resulting glass concentrate capsules which contain about 43% by weight of glass, pass through a 4.0 U.S.

Standard Screen and are retained on a 20 screen. These capsules weight 10 to 30 times more than the average weight of the ⅛ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

Examples 54 to 58, which are tabulated in the following Table IV, are set forth to illustrate some of the variations in the reactor charge which are possible within the scope of this invention. In each example the general polymerization methods of Example 45 are used and 0.3% by weight, based on the weight of the monomer, of lauroy peroxide, is used as the polymerization initiator. The encapsulated glass products obtained in each example are comparable to those obtained in Example 45.

TABLE IV.—SUMMARY OF EXAMPLES 54 TO 58 CHARGE TO REACTOR

| Ingredients (parts by weight) | Examples— | | | | |
|---|---|---|---|---|---|
| | 54 | 55 | 56 | 57 | 58 |
| Glass | 15 | 15 | 15 | 15 | 15 |
| Vinyl chloride | 40 | 40 | 40 | 32 | 38 |
| Vinyl acetate | | | | 8 | 2 |
| Water | 80 | 80 | 80 | 80 | 80 |
| Colloid: | | | | | |
| A | 0.2 | | | | |
| B | | 0.15 | | | |
| C | | | 0.2 | | |
| D | | | | 0.18 | 0.30 |

NOTE:
Colloid A = A copolymer of vinyl acetate and maleic anhydride (1/1 mole ratio).
Colloid B = Polyvinyl alcohol having a residual vinyl acetate content of 30% by weight and a 4% aqueous solution viscosity at 20° C. of 21 cps.
Colloid C = A copolymer of vinyl methyl ether and maleic anhydride (1/1 mole ratio).
Colloid D = The methyl cellulose used in Example 1.

EXAMPLE 59

This example illustrates the preparation of glass concentrate capsules which contain about 30% by weight of ¼ inch glass strands arranged in a collimated array within a poly(vinyl chloride) matrix. The following charge is used in this example:

Ingredients: Parts by weight
Chopped glass strands ¼ inch long _____ 15
Vinyl chloride _____ 44
Water _____ 85
Praotective colloid _____ 0.25
Lauroyl peroxide _____ 0.12

The protective colloid and the general procedures of Example 45 are used in this example.

The resulting glass concentrate capsules which contain about 32% by weight of glass, pass through a 2.5 U.S. Standard Screen and are retained on a 40 screen. These capsules weigh 10 to 35 times more than the average weight of the ¼ inch glass strands which are used as the starting material. Examination of a cross section of representative capsules shows a plurality of glass strands in a substantially collimated array wherein the microfibers in the strands are also encapsulated by polymer.

Other representative capsules are heated in a muffle furnace in order to burn off the polymer exposing a plurality of glass strands in a substantially collimated array.

The glass concentrate capsules of the present invention are blended with a thermoplastic resin matrix and then processed into useful composites. The use of the glass concentrate capsules of the present invention provides a more convenient and more economical process for preparing composites than other methods previously used in the prior art. Moreover, the physical properties of the composites prepared from the glass concentrate capsules of the present invention are superior in many respects to the properties of those composites prepared according to the procedures of the piror art. The improved properties which are obtained in the final composite include lower water absorption, higher tensile and impact strength, higher modulus and better elongation.

The following Examples 60 to 65 are set forth in order to illustrate the improved properties of composites which are prepared from the styrene containing glass concentrate capsules of the present invention.

In these examples the composites are prepared by mixing the glass or glass concentrate capsules with a thermoplastic resin matrix. The proportions of ingredients in each example are adjusted so as to provide composites containing approximately 20% by weight of glass. The blended ingredients are extruded on a 1 inch extruder using a single flight vinyl screw having a length to diameter ($L/D$) ratio of 18. The extrusions are carried out at temperatures of from 425° F. to 450° F. while cooling the hopper with water. The extrudate is air cooled on a long take-off table and chopped into ¼ inch to ½ inch chips in a standard double blade cutter.

Test specimens are injection molded at 450° F. and 700 to 1000 p.s.i. using an oversized orifice in the nozzle. The test specimens are then subjected to the following tests:

Tensile properties

Test specimens (4″ x ¼″ x ¹⁄₁₀″) are prepared by injection molding at 450° F. and 1000 p.s.i. Tensile moduli, fail strength and elongation are determined on a floor model Instron using an extensometer.

Izod impact

Test specimens (2½″ x ½″ x ⅛″) are molded under similar conditions to the tensile specimens except that 700 p.s.i. pressure is used. The specimens are notched with a 0/1″ notch radius and impact strength is determined using a 2 lb. hammer.

Heat distortion

Heat distortion is determined on injection molded 2½″ x ½″ x ⅛″ samples at 264 p.s.i., with a 2″ span.

EXAMPLE 60 (CONTROL)

This example is set forth as a control to illustrate the properties of test specimens which contain no glass reinforcing agent. The test specimens are copolymers of styrene and acrylonitrile containing 74% by weight styrene and 26% acrylonitrile. These specimens are prepared according to the above procedures. Test results are tabulated in Table V below.

EXAMPLE 61

This example is set forth to illustrate the properties of a composite which is prepared according to the teachings of the prior art. This example uses coated glass strands of the type illustrated in FIG. 2. These strands are prepared by coating an assembly of endless glass strands with a polymeric coating, fusing the coating and then chopping the coated assembly of strands into the desired length. This assembly of strands is then blended with a thermoplastic resin matrix which is a copolymer of styrene and acrylonitrile containing 72% by weight of styrene and 28% by weight of acrylonitrile. The resin matrix is in the form of rods which are approximately the same size and shape as the coated assembly of glass strands. Composites are formed and tested according to the above procedures. The test results are tabulated in the Table V below.

EXAMPLE 62

This example is set forth to illustrate the properties of a composite which is prepared according to the teachings of the prior art. In this example plain glass strands of the type illustrated in FIG. 1 are dry blended with a copolymer of styrene and acrylonitrile containing 74% styrene and 26% acrylonitrile. Special precautions are taken to insure proportionate feeding to the extruder in order to avoid the severe problems of glass segregation, non-uniformity of glass distribution, glass debundling during transfer and blending and bridging of glass in the feed hoppers. Composites are formed and tested according to the above procedures. The test results are tabulated in Table V below.

EXAMPLE 63

Glass concentrate capsules prepared in Example 1 above are blended with a styrene-acrylonitrile copolymer containing 74% styrene and 26% acrylonitrile. Composites are formed and tested according to the above procedures. The test results are tabulated in Table V below.

EXAMPLE 64

Example 63 is repeated here except using the glass concentrate capsules prepared in Example 4. Composites are formed and tested according to the above procedures. The test results are tabulated in Table V below.

EXAMPLE 65

Example 63 is repeated here except using the glass concentrate capsules prepared in Example 19. Composites are formed and tested according to the above procedures. The test results are tabulated in Table V below.

TABLE V.—SUMMARY OF EXAMPLES 60 TO 65—PROPERTIES OF COMPOSITES CONTAINING 20% GLASS

| Example [1] | Tensile p.s.i. ×10⁻³ | Percent elongation | Modulus p.s.i. ×10⁻⁵ | Heat distortion temperature, °C. 264 p.s.i. | Izod impact, ft. lbs./in. |
|---|---|---|---|---|---|
| 60 Control | 9.6 | 2.6 | 5.8 | 90 | 0.4 |
| 61 | 13.5 | 1.3 | 10.8 | 103 | 2.1 |
| 62 | 14.2 | 1.6 | 10.9 | 104 | 2.5 |
| 63 | 16.5 | 1.7 | 11.6 | 105 | 2.5 |
| 64 | 16.7 | 1.7 | 11.5 | 105 | 2.5 |
| 65 | 16.5–18 | 1.9 | 11.5 | 107 | 2.5 |

[1] Control sample contains no glass.

The data in the foregoing Table V clearly illustrate that composites prepared from the glass concentrate capsules of the present invention (Examples 63, 64 and 65) have generally superior physical properties than the control sample (Example 60) or those composites prepared according to the teaching of the prior art (Examples 61 and 62).

Note that except for percent elongation, the unreinforced polymer of Example 60 has poorer physical properties than those reinforced samples. Note also that the composites prepared from the glass concentrate capsules of the present invention (Examples 63, 64 and 65) have generally superior tensile strength, percent elongation, modulus and heat distortion than the control samples and the composites prepared according to the teachings of the prior art. The Izod impact strength obtained in Examples 63, 64 and 65 is superior to that obtained in Examples 60 and 61.

In the following Examples 66 to 71 composites containing 20% by weight of glass fibers are prepared from polyvinyl chloride polymers. These composites are prepared and tested according to the above procedures except that the specimens are extruded at 400° F. and molded at 370° F. All of the test specimens are prepared using 1% by weight of Acrawax C lubricant and 1.25% by weight of a tin stabilizer. The poly(vinyl chloride) diluent used in each example is a homopolymer having a weight average molecular weight in the range of from 50,000 to 58,000.

EXAMPLE 66 (CONTROL)

This example is set forth as a control to illustrate the properties of poly(vinyl chloride) test specimens which contain no glass reinforcing agent. The test specimens are prepared according to the above procedures. Test results are tabulated in Table VI below.

EXAMPLE 67

Example 66 is repeated here except that 20% by weight of the poly(vinyl chloride) is replaced by a styrene/acrylonitrile copolymer which contains 74 weight percent styrene and 20 weight percent acrylonitrile. This example is included as a control to illustrate that the presence of poly(styrene-acrylonitrile) upgrades the physical properties of the poly(vinyl chloride).

EXAMPLE 68

This example is set forth to illustrate the properties of a composite which is prepared according to the teachings of the prior art. In this example plain glass strands of the type illustrated in FIG. 1 are dry blended with poly(vinyl chloride) homopolymer. Special precautions were taken to insure proportionate feeding to the extruder in order to avoid the severe problems of glass segregation, non-uniformity of glass distribution, glass debundling during transfer and blending and bridging of glass in the feed hoppers. Composites are formed and tested according to the above procedures. The test results are tabulated in the Table VI below.

EXAMPLE 69

Example 68 is repeated here except that about 20% of the poly(vinyl chloride) is replaced by the styrene/acrylonitrile copolymer used in Example 67. This example is set forth in order to further illustrate the superior physical properties that are obtained in composites prepared using the glass concentrate capsules of the present invention.

EXAMPLE 70

In this example the glass concentrate capsules prepared in Example 45 above are blended with the poly(vinyl chloride) homopolymer. Composites are formed and tested according to the above procedures. The test results are tabulated in Table VI below.

EXAMPLE 71

Example 70 is repeated here except using the glass concentrate capsules prepared in Example 53. Composites are formed and tested according to the above procedures. The test results are tabulated in Table VI below.

TABLE VI.—SUMMARY OF EXAMPLES 66 TO 71—PROPERTIES OF COMPOSITES CONTAINING 20% GLASS

| Example [1] | Tensile p.s.i. ×10⁻³ | Percent elongation | Modulus p.s.i. ×10⁻⁵ | Heat distortion temperature, °C. 264 p.s.i. | Izod impact, ft. lbs./in. |
|---|---|---|---|---|---|
| 66 Control | 7.8 | 3.5 | 4.1 | 71 | 0.7 |
| 67 Control | 8.0 | 3.1 | 4.4 | 72.5 | 0.56 |
| 68 | 10.1 | 1.4 | 10.8 | 78.5 | 1.2 |
| 69 | 10.6 | 1.3 | 10.4 | 80 | 1.2 |
| 70 | 14.1 | 1.6 | 11.9 | 79.5 | 2.8 |
| 71 | 14.0 | 1.7 | 11.8 | 80 | 2.8 |

[1] The composites in Examples 66 and 67 are control samples which contain no glass. The composites in Examples 68 and 69 are prepared by the prior art method of dry blending glass strands and the thermoplastic polymer matrix. The composites in Examples 70 and 71 are prepared using the glass concentrate capsules of the present invention.

The data in the foregoing Table VI clearly illustrate that composites prepared from the glass concentrate capsules of the present invention (Examples 70 and 71) have generally superior physical properties than the control samples (Examples 66 and 67) or those composites prepared according to the teaching of the prior art (Examples 68 and 69).

Except for percent elongation, the unreinforced polymers of Examples 66 and 67 have poorer physical properties than those reinforced samples. In Example 67, when a styrene/acrylonitrile copolymer is blended with the poly(vinyl chloride) there is a slight increase in tensile, modulus and heat distortion which is accompanied by a decrease in percent elongation and Izod impact. However, the physical properties of this polyblend are still inferior to the glass reinforced polymers.

Examples 68 and 69 are prepared by the conventional prior art method of dry blending glass strands and the resin matrix. These glass reinforced examples have superior physical properties to the unreinforced samples in Examples 66 and 67 except for percent elongation. Note once again that substitution of a styrene/acrylonitrile copolymer for part of the poly(vinyl chloride) gives rise to a difference in some of the physical properties. In this regard note that Example 69 has slightly better tensile and heat distortion than the corresponding Example 68 which does not contain a styrene/acrylonitrile copolymer. However, the properties of these samples are still inferior to those samples prepared from the glass concentrate capsules of the present invention.

Examples 70 and 71, which are prepared using the glass concentrate capsules of the present invention, are definitely superior in tensile, modulus, heat distortion and Izod impact to those samples which do not contain any glass reinforcing element (Examples 66 and 67). Examples 70 and 71 are also superior to Examples 68 and 69, the glass reinforced composites prepared by the dry blending procedure of the prior art, in regard to tensile, percent elongation, modulus and Izod impact.

The superior tensile, modulus and Izod impact results which are obtained using the glass concentrate capsules of the present invention (Examples 70 and 71) are surprising in view of the fact that prior attempts to reinforce poly(vinyl chloride) with glass have been met with considerable difficulty. Consequently, it was believed that the physical properties of poly(vinyl chloride) could not be upgraded to the same extent by glass fibers as the styrene homopolymers and copolymers. Poly(vinyl chloride) presented a problem in that the adhesion between the poly (vinyl chloride) and the glass was less than desirable. Furthermore, it was believed that the processing conditions required for poly(vinyl chloride)/glass composites caused abrasion and subsequent degradation of the glass fibers. Consequently, the glass fibers lost much of their reinforceability during the processing step.

The glass concentrate capsules of the present invention go a long way to solving the foregoing problems. In the present invention there is better wetting of the glass by the monomer. This leads to better adhesion of the poly(vinyl chloride) matrix to the glass and subsequent encapsulation of the individual fibers within the glass strands which are all encapsulated with poly(vinyl chloride) and arranged in a collimated array.

In addition, water absorption tests are run by soaking the composite in water at 80° C. (65° C. for vinyl chloride polymers) for 24 hours. After this time the sample is examined visually, the amount of water pickup is measured, and a tensile test is run on the wet sample. The test samples which are prepared using the glass concentrate capsules of the present invention, show less opaqueness, less water pickup and higher wet tensile strength than do the test samples from the other examples.

It would appear that the poorer water absorption test results, that were obtained in the composites which were prepared according to the teachings of the prior art, are due to water wicking in along the glass fibers in the composite causing separation of the matrix from the glass with resulting numerous microcracks which causes opaqueness in the composite. Consequently, these composites absorb more water, exhibit more opaqueness and exhibit a greater decrease in tensile strength than those composites which are prepared from the glass concentrate capsules of the present invention. In the glass concentrate capsules of the present invention the individual strands and the microfibers making up the strands are encapsulated by the polymeric matrix. Thus, there is less wicking of water by the glass fibers, less water absorption, less opaqueness and greater retention of tensile strength. Moreover, it is observed, after burning off the resin matrix, that the glass fibers from the glass concentrate capsules of the present invention show far less fiber abrasion or damage due to mechanical processing in the extruding and molding operation. On the other hand, there is much greater fiber abrasion and damage in those composites which are prepared according to the teachings of the prior art. Presumably, the polymeric coating around the individual microfibers and glass strands in the glass concentrate capsules of the present invention protects the fibers from damage and abrasion during mechanical processing of these materials. Consequently, the fibers are better able to reinforce the resulting composite thus giving it greater strength.

The foregoing theory in regard to the better properties of composites made from the glass concentrate capsules of the present invention is set forth to explain the observed effects and is not intended that the scope of the invention should, in any way, be limited by this theory.

The composites which are prepared from the glass concentrate capsules of the present invention are especially useful in the fabrication of molded and extruded parts for automobiles such as dashboards, moldings, trim, etc., refrigerators, radio and television cabinets. Other uses for these composites are found in household appliances, industrial applications and in general wherever high performance thermoplastic resin parts are required.

It will be obvious to those skilled in the art that many modifications may be made in the products and processes set forth above without departing from the scope of this invention.

What is claimed is:

1. Glass concentrate capsules comprising from 10 to 80% by weight of glass strands having a length of from $\frac{1}{32}$ to $\frac{3}{4}$ inch which strands are arranged in a substantially collimated array within a thermoplastic resin matrix, wherein the individual fibers in the strands, the individual strands in the collimated array and the collimated array of glass strands are encapsulated in the thermoplastic resin matrix.

2. The glass concentrate capsules of claim 1 wherein the matrix is prepared from styrene monomer.

3. The glass concentrate capsules of claim 2 wherein the matrix is a copolymer of styrene and at least one other comonomer.

4. The glass concentrate capsules of claim 2 wherein the matrix is polyvinyl chloride.

5. Glass concentrate capsules comprising from 10 to 80% by weight of glass strands having a length of from $\frac{1}{32}$ to $\frac{3}{4}$ inch which strands are arranged in a substantially collimated array within a thermoplastic resin matrix wherein the capsules have a particle size such that they pass through a 2.5 U.S. Standard Screen and are retained on a 40 U.S. Standard Screen and wherein the individual fibers in the strands, the individual strands in the collimated array and the collimated array of glass strands are encapsulated in the thermoplastic resin matrix.

6. The glass concentrate capsules of claim 5 prepared from glass strands having a length of from about $\frac{1}{8}$ inch to about $\frac{1}{4}$ inch.

7. The glass concentrate capsules of claim 5 which contain from 20 to 70% by weight of glass strands.

8. The glass concentrate capsules of claim 5 wherein the matrix is prepared from styrene monomer.

9. The glass concentrate capsules of claim 5 wherein the matrix is a copolymer of styrene and at least one other comonomer.

10. The glass concentrate capsules of claim 5 wherein the matrix is polyvinyl chloride.

11. Glass concentrate capsules comprising
   (A) from 20 to 70% by weight of glass strands having a length in the range of from about $\frac{1}{8}$ to about $\frac{1}{4}$ inch which strands comprise a plurality of microfibers; and
   (B) from 30 to 80% by weight of a thermoplastic resin matrix selected from the group consisting of poly (vinyl chloride) homopolymers and copolymers and polystyrene homopolymers and copolymers;

wherein the individual microfibers in the glass strands are encapsulated within the thermoplastic resin matrix, wherein the individual glass strands are encapsulated within the thermoplastic resin matrix and arranged in a substantially collimated array which is encapsulated within the thermoplastic resin matrix; and wherein the capsules have a particle size such that they pass through a 2.5 U.S. Standard Screen and are retained on a 40 U.S. Standard Screen.

12. The glass concentrate capsules of claim 11 wherein the matrix is a copolymer of styrene and at least one other monomer.

13. The glass concentrate capsules of claim 12 wherein the matrix is a copolymer of styrene and acrylonitrile.

14. The glass concentrate capsules of claim 12 wherein the matrix is a copolymer of styrene, acrylonitrile and methacrylic acid.

15. The glass concentrate capsules of claim 11 wherein the matrix is polyvinyl chloride.

16. The glass concentrate capsules of claim 11 wherein the matrix is a copolymer of polyvinyl chloride and at least one other monomer.

17. Glass concentrate capsules as in claim 11 wherein the glass concentrate capsules weigh about 10 to 250 times more than the average weight of one of the original glass strands.

18. Glass concentrate capsules comprising
   (A) from 20 to 70% by weight of glass strands having a length in the range of from about ⅛ to ¼ inch which strands comprise a plurality of microfibers; and
   (B) from 30 to 80% by weight of a thermoplastic resin matrix selected from the group consisting of polystyrene homopolymers and copolymers;
wherein the individual microfibers in the glass strands are encapsulated within the thermoplastic resin matrix; wherein the individual glass strands are encapsulated within the thermoplastic resin matrix and arranged in a substantially collimated array which is encapsulated within the thermoplastic resin matrix; and wherein the capsules have a particle size such that they pass through a 2.5 U.S. Standard Screen and are retained on a 40 U.S. Standard Screen.

19. The glass concentrate capsules of claim 18 wherein the matrix is a copolymer of styrene and at least one other monomer.

20. The glass concentrate capsules of claim 18 wherein the matrix is a copolymer of styrene and acrylonitrile.

21. The glass concentrate capsules of claim 18 wherein the matrix is a copolymer of styrene, acrylonitrile and methacrylic acid.

References Cited

UNITED STATES PATENTS

| | | | |
|---|---|---|---|
| 2,877,501 | 3/1959 | Bradt | 264—261 |
| 2,881,732 | 4/1959 | Chrystman | 117—126 GR |
| 3,022,210 | 2/1962 | Philipps | 161—170 |
| 3,119,718 | 1/1964 | Bradt | 117—126 GR |
| 3,274,136 | 9/1966 | Glesner et al. | 117—126 GR |
| 3,312,569 | 4/1967 | Philipps et al. | 161—175 |
| 3,403,069 | 9/1968 | Benson | 161—176 |

ROBERT F. BURNETT, Primary Examiner

R. L. NAY, Assistant Examiner

U.S. Cl. X.R.

161—176; 264—261

PO-1050
(5/69)

UNITED STATES PATENT OFFICE
CERTIFICATE OF CORRECTION

Patent No. 3,671,384    Dated  June 20, 1972

Inventor(s) Massimo Baer & Joseph O. Campbell

It is certified that error appears in the above-identified patent and that said Letters Patent are hereby corrected as shown below:

Column 15, line 66, "5 to 30" should read --- 10 to 30 ---.

Column 17, line 49, "Praotective colloid" should read --- Protective colloid ---.

Under "References Cited", add

--- 3,544,421    12/1970   Griffith---------- 161-60 ---.

Signed and sealed this 9th day of January 1973.

SEAL)
ttest:

DWARD M. FLETCHER, JR.            ROBERT GOTTSCHALK
ttesting Officer                  Commissioner of Patents